US006293105B1

(12) United States Patent
Claesson et al.

(10) Patent No.: US 6,293,105 B1
(45) Date of Patent: Sep. 25, 2001

(54) GAS TURBINE WITH A PLURALITY OF BURNERS AND A FUEL DISTRIBUTION SYSTEM, AND A METHOD FOR BALANCING A FUEL DISTRIBUTION SYSTEM

(75) Inventors: Ola Claesson, Umea (SE); Jaan Hellat, Rütihof-Baden; Werner Kessler, Wallisellen, both of (CH); Frank Reiss, Lauchringen; Wilfried Strittmatter, Laufenburg, both of (DE); Stefan Tschirren, Nunningen (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/339,945

(22) Filed: Jun. 25, 1999

(30) Foreign Application Priority Data

Jun. 29, 1998 (EP) .................................... 98810600

(51) Int. Cl.$^7$ ...................................... F02C 1/00
(52) U.S. Cl. ............................................... 60/748
(58) Field of Search ................... 60/39.06, 734, 60/739, 746

(56) References Cited

U.S. PATENT DOCUMENTS

| 2,657,702 | 11/1953 | Weisenbach . | |
|---|---|---|---|
| 4,028,888 | * 6/1977 | Pilarczyk | ............................ 60/39.32 |
| 5,024,055 | 6/1991 | Sato et al. . | |
| 5,119,636 | 6/1992 | Batakis et al. . | |
| 5,319,931 | 6/1994 | Beebe et al. . | |
| 5,373,692 | 12/1994 | Correa . | |

FOREIGN PATENT DOCUMENTS

| 32 38 045 A | 4/1983 | (DE) . |
|---|---|---|
| 32 38 046 A1 | 4/1983 | (DE) . |
| 38 18 779 A | 4/1989 | (DE) . |
| 196 39 329 A | 3/1998 | (DE) . |
| 760 406 A | 10/1956 | (GB) . |
| 760406 | * 10/1956 | (GB) . |

OTHER PUBLICATIONS

European Search Report dated Dec. 1, 1998.

* cited by examiner

Primary Examiner—Charles G. Freay
Assistant Examiner—William Rodriguez
(74) Attorney, Agent, or Firm—Burns, Doane, Swecker & Mathis, L.L.P.

(57) ABSTRACT

In a gas turbine (10) with a plurality of individual burners (B1, . . . , B6; Bn) which are connected to a fuel distribution system (21) and are supplied with fuel from a common fuel feed (28) via the fuel distribution system (21), there being provided, within the fuel distribution system (21), means by which the fuel mass flows to the individual burners (B1, . . . , B6; Bn) can be varied in order to improve the operating parameters of the gas turbine (10), an improvement in the operating parameters is achieved in a simple way in that a fixed throttle member, determining the fuel mass flow to at least one of the burners (B1, . . . , B6; Bn), is arranged in the fuel distribution system (21) upstream of the at least one burner, and in that the reduction in cross section of the throttle member is selected in such a way that existing inequalities in the fuel distribution system (21) as regards the fuel mass flows to the individual burners (B1, . . . , B6; Bn) are reduced.

7 Claims, 3 Drawing Sheets

GAS TURBINE WITH A PLURALITY OF BURNERS AND A FUEL DISTRIBUTION SYSTEM, AND A METHOD FOR BALANCING A FUEL DISTRIBUTION SYSTEM

BACKGROUND OF THE INVENTION

1. Field of the Invention

The present invention relates to the field of gas turbines. It refers to a gas turbine with a plurality of individual burners which are connected to a fuel distribution system and are supplied with fuel from a common fuel feed via the fuel distribution system, there being provided, within the fuel distribution system, means by which the fuel mass flows to the individual burners can be varied in order to improve the operating perimeters of the gas turbine.

Such a gas turbine is known, for example, from the publications U.S. Pat. No. 5,024,055 or U.S. Pat. No. 5,319,931 or U.S. Pat. No. 5,373,692.

2. Discussion of Background

High-powered gas turbines, such as are used in combined cycle power stations, are often operated with a plurality of burners. Examples of gas turbines of this kind are found in the publications initially mentioned. Gas turbines of this type which are used commercially have been sold by Asea Brown Boveri AG, for example under the type designations GT 13E2, GT 24 or GT 26. A block diagram of such a gas turbine is illustrated in FIG. 1. The gas turbine 10 includes a compressor 12 and a turbine 14, which are conventionally arranged on a common shaft 13. Between the compressor 12 and turbine 14 is provided a combustion chamber 18, in which a plurality of (in the example, six) burners B1, ..., B6 generate hot combustion gases as a result of the combustion of a liquid or gaseous fuel. The burners B1, ..., B6 may be equipped, for example, with extractable burner lances which introduce the fuel and, if appropriate, combustion air for injection into the burner. The various burners B1, ., B6 of the gas turbine 10 are supplied with fuel from a fuel source (not shown) via a fuel distribution system 21. The fuel is fed to the fuel distribution system 21 via a central fuel feed 28 and one or more fuel regulating valves 20. Individual branch lines 23 extend from the common distribution line 22 to the burners B1, ..., B6. The combustion air necessary for the combustion of the fuel is sucked in by the compressor 12 via an air feed 11, compressed and subsequently fed, via a compressed-air duct 16, into a plenum chamber 19, from where it passes through corresponding orifices into the burners B1, ... B6 or fuel lances. The hot combustion gases from the combustion chamber 18 pass, via a hot-gas duct 17, into the turbine 14, where they perform work in one or more stages and are subsequently available, at an exhaust-gas outlet 15 of the turbine 14, for further use (for example, for generating steam in a waste-heat boiler).

In order, then, to ensure that the (leanly operated) burners deviating downward from the average value remain well above the extinguishing limit LG, and so that the machine can be operated reliably and stably, the average value M to be set via the fuel regulating valve 20 must be selected well above the lean extinguishing limit LG. Fuel-enriched burners (B3, B4, B5) therefore run in addition to lean burners (B1, B2, B6). In an extreme situation, the fuel-enriched burners must even assist combustion in the lean burners (external pilot control). The result of this, ultimately, is that the emission average value M to be set in this way deviates markedly from the minimum obtainable (individual burner evidence in the individual burner test). Under some circumstances, therefore, in the case of a multiburner configuration, a considerably worsened lean extinguishing limit can be obtained, as compared with the individual burner. The same also applies to the temperature profile. The actual aim, specifically also to achieve a homogeneous emission and temperature profile, particularly in the case of annular combustion chambers, by means of homogeneous combustion, has hitherto, in practice, been achieved only approximately on account of manufacturing tolerances, design accuracy and the like. This may, indeed, be sufficient for a reliable (rough) setting of the gas turbine, however, the existing potential of gas turbines with multiple burner arrangements is certainly not fully utilized in this way.

U.S. Pat. No. 5,024,055 describes a gas turbine with a multiple burner arrangement, in which the unburned hydrocarbons (UHCs) of the individual burners are detected at the turbine outlet by means of sensors arranged in a distributed manner. The measured values are used for adjusting the fuel/air ratio for each individual burner to its optimum value via individual regulating valves in the fuel feed lines (branch lines) to the burners. Regulation of the air feed also takes place in addition. Although this regulation makes it possible for essentially optimum combustion ratios to be achieved permanently in the individual burners, this regulation, with its multiplicity of sensors and, in particular regulating valves (two regulating valves for each two-stage burner), is not only extremely complicated, but also susceptible to faults.

U.S. Pat. No. 5,319,931 proposes a method for trimming the fuel/air ratio of the individual burners in a gas turbine with a two-stage multiple burner arrangement and with an inhomogeneous air feed, in which a trimming unit, which contain s an adjustable valve, is arranged in each of the fuel feed lines (branch lines) to the burners. In order to compensate the unequal operating parameters of the burners, which occur as a result of an unequal air feed, the fuel feed to the individual burners is retrimhed manually or automatically by means of the trimming device in accordance with specific measurement values (for combustion chamber pressure, temperature and fuel mass flow). Trimming, in this case, relates to an unequal air feed, but not to an unequal fuel feed. Furthermore, in this case too, a multiplicity of valves equipped with moveable parts and susceptible to faults are used. In addition, during operation in the automatic mode, various diaphragms also have to be arranged in the trimming units, in order to ensure reliable and accurate regulation.

Finally, U.S. Pat. No. 5,373,692 discloses a trimming system for minimizing the NOx emissions of a gas turbine with a multiple burner arrangement, in which two parallel-connected regulating valves are arranged in each case in the fuel feed lines (branch lines) to the individual burners, said regulating valves being actuated by central control in accordance with the measurement values from an NOx sensor. The main valve of the parallel connection serves, in this case, for the basic setting, whilst the secondary valve is provided for trimming. In this case, too, due to the two valves for each burner, there is a considerable outlay in terms of apparatus and increased susceptibility to faults.

SUMMARY OF THE INVENTION

The object of the invention, therefore, is to provide a gas turbine with a multiple burner arrangement, in which the different fuel mass flows of the individual burners, caused by inequalities in the fuel distribution system, are compensated by simple and effective means which are easy to install, even at a later date, and which are safe from faults.

The object is achieved, in a gas turbine of the type initially mentioned, in that a fixed throttle member, determining the fuel mass flow to at least one of the burners is arranged in the fuel distribution system upstream of the at least one burner, and in that the reduction in cross section of the throttle member is selected in such a way that existing inequalities in the fuel distribution system as regards the fuel mass flows to the individual burners are reduced. The invention, at the same time, is based on the knowledge that, on the one hand, it is usually simpler to adapt and homogenise the fuel mass flow and that, on the other hand, in most machines (gas turbines), an approximately even air feed to the individual burners is ensured, so that, in most cases, irrespective of the air feed, a significant improvement can be achieved solely by evening the fuel feed. The essence of the invention is, in those burners which are supplied with more fuel by the fuel distribution system and are therefore operated with a richer mixture, as compared with the average value, to throttle the fuel feed permanently and in a fixed manner by the installation of a permanently fixed throttle point, so that the dispersion of the burners around the average value becomes altogether lower. It is advantageous, at the same time, that design-related fixed unevennesses in the fuel distribution system are thereby permanently corrected in a simple way, which leads to a permanent improvement in the operating parameters, without having the susceptibility of regulating valves to faults.

Particularly low costs and simple assembly are achieved if, according to a first preferred embodiment of the invention, the throttle member is designed as an orifice. Such an orifice, with a selected diameter of the aperture, is compact, mechanically robust and insensitive, is simple to produce and can be assembled (even at a later date) at a suitable point in the fuel distribution system so as to take up an extremely small amount of space.

It is particularly beneficial if, according to a preferred development of this embodiment, the fuel distribution system comprises a common distribution line, from which branch lines lead off to the individual burners and are connected to the respective burner by means of a screwable line connection, if the orifice is arranged within the associated line connection, and if the orifice is designed as a perforated disk and is releasably arranged within the line connection.

The inventive method for balancing the fuel distribution system of a gas turbine according to the invention is defined in that the fuel pressure or feed pressure prevailing at the individual burners is measured relative to a fixed reference pressure, and in that the throttle member is selected in accordance with the measured pressure differences between the feed pressure and the reference pressure. The pressure measurement has no need for sensors specially designed for use in hot gas and may, in principle, be carried out once, even while the gas turbine is shut down or before it is put into operation (for example, by means of inert gas measurements).

A first embodiment of the inventive method is defined in that the burners open into a common combustion chamber, and in that the pressure in the combustion chamber (combustion space internal pressure) is measured as the reference pressure. A disadvantage of this is that these measurements have to be carried out during operation.

As an alternative to this, a second preferred embodiment of the method according to the invention is distinguished in that the feed pressure of one of the burners is used as the reference pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 4:
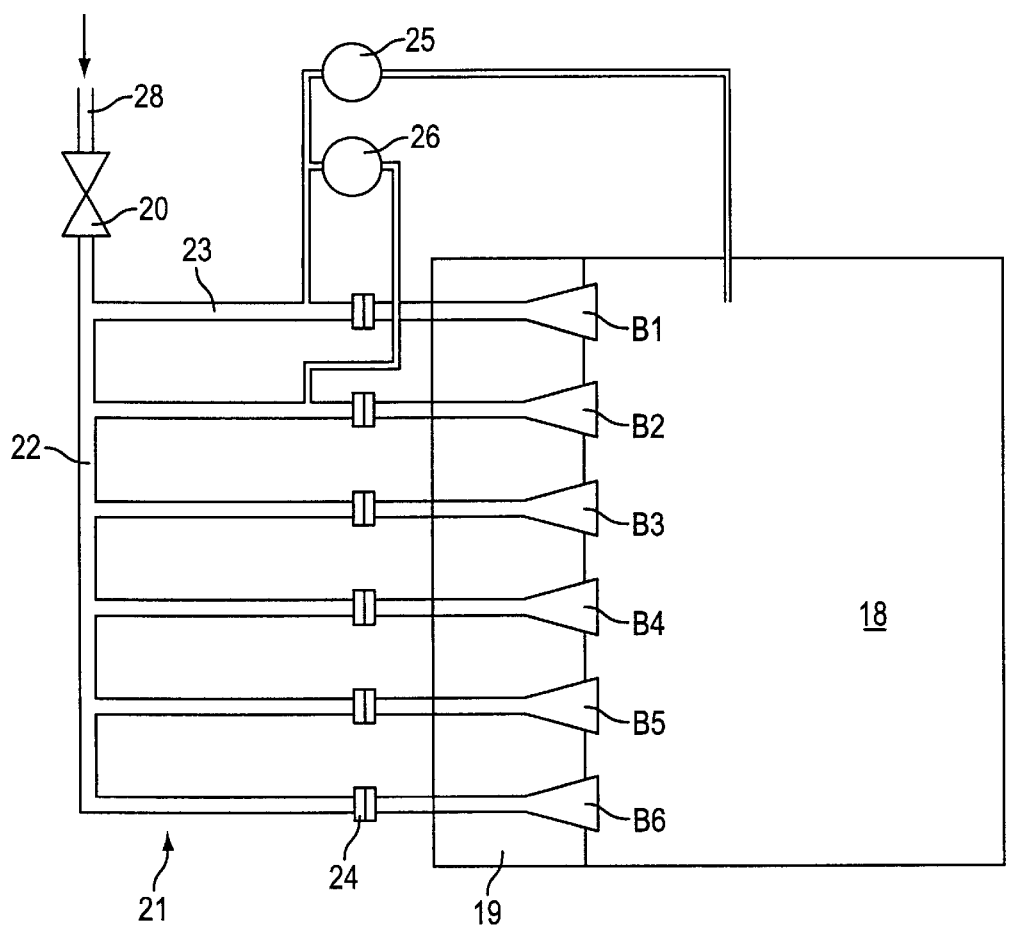
FIG. 4 shows alternative measuring arrangements for carrying out the inventive method in a fuel distribution system according to FIG. 1.

Referring now to the drawings, wherein like reference numerals designate identical corresponding parts throughout the several views, in order to implement the invention, specifically for evening the fuel feed to the burners by means of installed throttle members, the existing fuel distribution to the individual burners (B1, . . . , B6 in FIG. 4) must first be determined or measured, in order to establish the individual supply of the (gaseous) fuel to the individual burners. It is conceivable, in principle, for the exhaust gas temperature or the NOx emission downstream of the turbine to be used, if already available, as a measurement variable for this purpose. Only distortion of the locally generated combustion indicators (temperature, emissions) occurs in the turbine, but no intermingling. Consequently, knowing the distortion and taking it into account, the local combustion can be inferred directly. If there is an appropriate resolution, the combustion of individual burners can then be directly influenced and corrected. A precondition for this would be a local measurement of the exhaust gas temperature and/or emissions by means of measuring nipples arranged, distributed, in the exhaust gas diffuser. In order to keep the outlay in terms of measuring equipment low, a cyclic changeover between the individual measuring nipples would be possible.

However, according to the invention, unequal distribution is determined with markedly lower outlay by means of simple pressure difference measurements. Two methods, in particular, may be considered for this purpose:

In one method, the fuel-side pressure difference of all the burners $$\Delta p(Bn) = p(Bn) - p_{BK}, n=1, \ldots, 6$$

is measured, p(Bn) being the feed pressure of the n-th burner directly upstream of the burner Bn in the respective branch line 23, and PBK being the pressure in the combustion chamber 18 (combustion space internal pressure). The combustion space internal pressure can be measured, for example, at a favorable reference pressure measuring point in the combustion chamber 18. This type of method is illustrated symbolically in FIG. 4, for the first burner B1, by the differential pressure meter 25.

In the other method, it is not absolutely necessary to have a reference pressure measuring point in the combustion chamber. Specifically, in this case, all the feed pressures are measured relative to the feed pressure of a reference burner:

$$\Delta p(Bn, 1) = p(Bn) - p(B1), n=2, \ldots, 6,$$

or $$\Delta p(Bn, 2) = p(Bn) - p(B2), n=1, 3, \ldots, 6,$$

if, for example, the burner B1 resp. B2 is used as the reference burner. This type of method is illustrated symbolically in FIG. 4, for the burner B2 resp. B1, by the differential pressure meter 26.

In order, then, to achieve an evening of the fuel distribution, the distribution must be influenced. The fuel, of which some burners receive too much, must therefore be fed to those burners which receive too little. This is carried out in that, according to the invention, by the insertion of throttle members, the pressure loss is increased at those burners which receive too much fuel. This may take place by means of additional (passive) throttle members either in the branch lines or in the burners or burner lances themselves (lance adaptation). The throttling of the fuel-rich burners, then, is refined and adapted until the inhomogeneities are markedly reduced and approximately the same pressure difference is measured over all the burners. It may then be assumed that a marked improvement in the equal distribution of the fuel feed and, consequently, of the burner Φ has occurred. Combustion should then take place with similar parameters (in particular, the same flame temperature) in all the individual burners.

Figure 1:
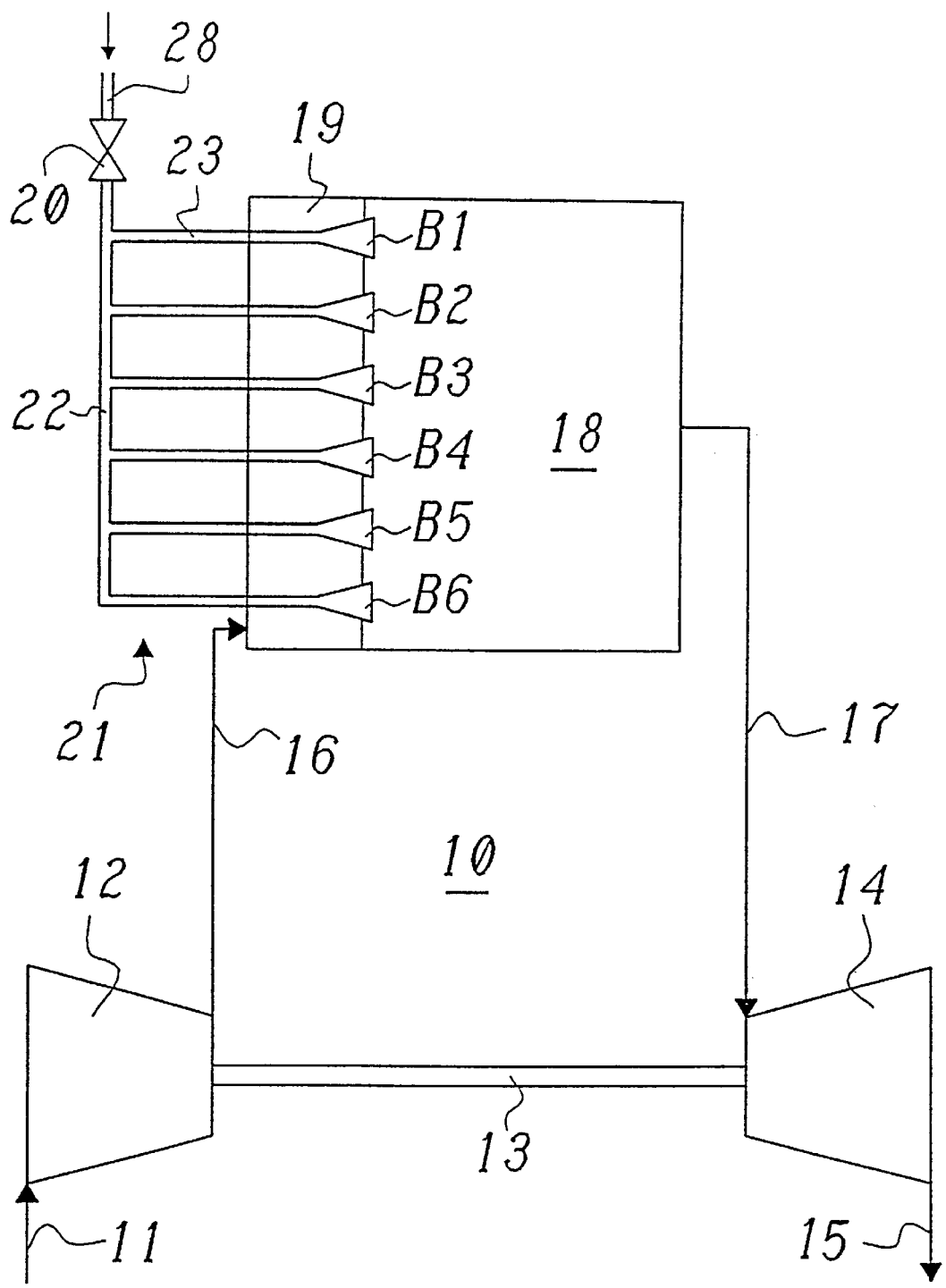
FIG. 1 shows a block diagram of a gas turbine with a multiple burner arrangement according to the prior art, on which the invention is also based.
Figure 2:
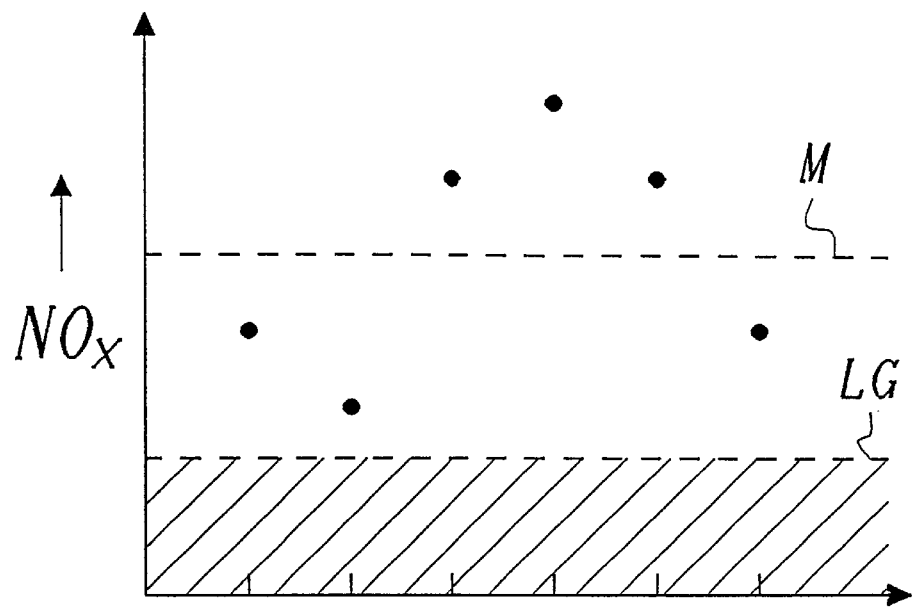
FIG. 2 shows an example of the distribution of the NOx values of a plurality of burners of a gas turbine according to FIG. 1, with a high dispersion of the values around an average value M, said dispersion being caused by inequalities in the fuel distribution system.
Figure 3:
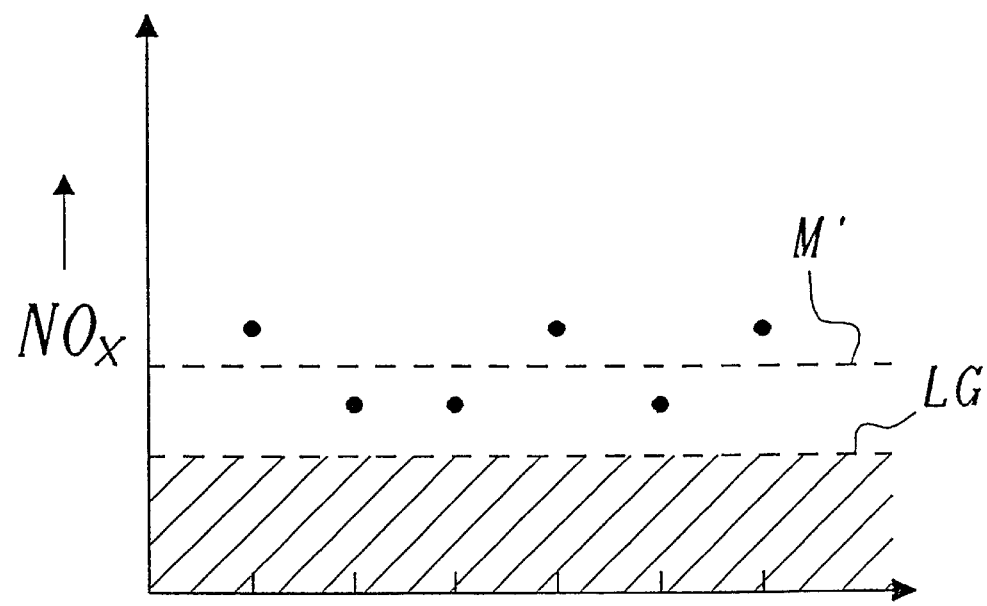
FIG. 3 shows an illustration comparable to that of FIG. 2, with a dispersion of the values around a lowerable average value M', said dispersion being reduced as a result of the invention.

When all the burners B1, ..., B6 have been measured one way or the other, those burners having the higher pressure differences (and correspondingly higher mass throughflows) have their fuel inflow throttled in a controlled manner by the insertion of an appropriately dimensioned throttle member upstream of the burner. If, in the example of FIG. 2, for instance the burners B3, B4 and B5 are throttled, their NOx values are thereby lowered, thus resulting in a distribution according to FIG. 3, with an average value M' altogether lowered, as compared with FIG. 2.

Figure 5:
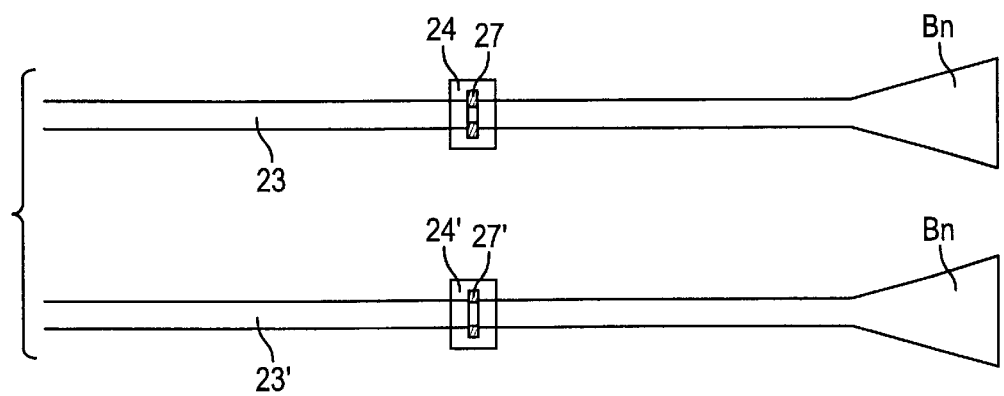
FIG. 5 shows an enlarge illustration of branch lines screwed to individual burners or to individual burner lances and having inserted orifices of different size, according to a preferred exemplary embodiment of the invention.

The throttling of the individual burners is preferably carried out, according to FIG. 5, in that orifices 27, 27' in form of perforated disks having defined possibly differently sized central apertures are inserted at the point at which the associated branch line 23, 23' are connected to the associated burner or burner lance by means of a releasably screwed line connection 24, 24'. For this purpose, the screw union of the line connection 24, 24' is released, the orifice is inserted between the end of the branch line and the screw of the burner, and the line connection is subsequently screwed together again. It is also conceivable, however, for throttling to be carried out within the burner lance itself. It is possible, in this simple reliable way, to set the machine as a whole to better emission values. The gas turbine can then be operated nearer to the extinguishing limit LG, that is to say nearer to the lower NOx limit value. At the same time, (in the case of annular burners) better overall temperature and emission profiles can be measured.

The invention may advantageously be employed in both single-group and multigroup concepts. If the burners of a machine are divided into a plurality of groups, sometimes not all the groups are operated with the same burner Φ. Nevertheless, even in a multigroup concept, the measure according to the invention will bring about a marked improvement in emissions and temperature profile. It is then merely necessary, where appropriate, for the individual groups to be separately measured and evened out.

The invention may also be particularly important and effective when there is a change in the gas composition (for example, a lower calorific value) or in the gas temperature (for example, as a result of the subsequent use of gas preheating). Due to the volume flow which is then greater, inhomogeneities in the fuel distribution system have an even more marked effect and may lead to appreciably poorer emission values and temperature profiles. Inventive action on the fuel feed can correct this again, so that the emissions and temperature profile once more achieve markedly better values.

Finally, it may also be pointed out that the measurement of the pressure differences in respect of individual burners may also be adopted for the monitoring or fault analysis of the machine. Thus, for example, a fault in the fuel distribution system (for example, a clogged fuel filter upstream of individual burners or sectors) can be determined by means of measurement and subsequent comparison with a first-setting measurement.

Altogether, the invention affords a simple, reliable and effective measure for improving the emission values and temperature profiles of gas turbines with multiple burner arrangements.

Numerous modifications and variations of the present invention are possible in light of the above teachings. It is therefore to be understood that within the scope of the appended claims, the invention may be practiced otherwise than as specifically described herein.

What is claimed as new and described to be secured by Letters Patent of the United States is:

1. A gas turbine comprising:
   a plurality of individual burners;
   a fuel distribution system including a common fuel feed, the plurality of burners connected to the fuel distribution system for being supplied with fuel from the common fuel feed via the fuel distribution system;
   a fixed throttle member arranged in the fuel distribution system upstream of at least one of the plurality of burners and determining the fuel mass flow to the at least one of the plurality of burners, the fixed throttle member having a reduction in cross section selected to reduce inequalities in the fuel mass flows through the fuel distribution system to the individual burners;
   wherein the throttle member is a first throttle member and the at least one burner is a first burner, and further comprising a second throttle member having a cross section different from the cross section of the first throttle member, the second throttle member arranged in the fuel distribution system upstream of a second burner of the plurality of burners.

2. The gas turbine as claimed in claim 1, wherein the first throttle member comprises an orifice.

3. The gas turbine as claimed in claim 2, wherein the fuel distribution system comprises:
   a common distribution line;

a plurality of branch lines, the branch lines each fluidly connecting the common distribution line to one of the plurality of individual burners; and a screwable line connection between each of the plurality of branch lines and each of the plurality of individual burners, and wherein the first throttle member is arranged within the screwable line connection.

4. The gas turbine as claimed in claim 3, wherein the orifice is a perforated disc releasably arranged within the screwable line connection.

5. A method for balancing the fuel distribution system of a gas turbine comprising the steps of:

measuring a pressure selected from the group consisting of the fuel pressure and the feed pressure prevailing at individual burners of the gas turbine relative to a fixed reference pressure; and selecting a throttle member based upon the difference between the measured fuel pressure and the reference pressure.

6. The method as claimed in claim 5, wherein a plurality of individual burners open into a common combustion chamber, and wherein the measuring step comprises measuring the pressure in the combustion chamber as the reference pressure.

7. The method as claimed in claim 5, wherein the measuring step comprises measuring the feed pressure of one of a plurality of individual burners as the reference pressure.

* * * * *